United States Patent [19]

Malinchak

[11] 3,875,631

[45] Apr. 8, 1975

[54] INSERTS FOR METAL CUTTERS

[76] Inventor: Paul Malinchak, 5247 W. 51st St., Fairview, Pa. 16415

[22] Filed: Feb. 28, 1974

[21] Appl. No.: 446,708

Related U.S. Application Data

[63] Continuation of Ser. No. 280,776, Aug. 15, 1972, abandoned.

[52] U.S. Cl.................................. 29/95 R; 29/105
[51] Int. Cl................................................ B26d 1/00
[58] Field of Search......................... 29/95, 96, 105

[56] References Cited
UNITED STATES PATENTS

| | | | |
|---|---|---|---|
| 2,693,020 | 11/1954 | Pelphrey | 29/105 |
| 3,574,911 | 4/1971 | Penoyar | 29/95 |
| 3,636,602 | 1/1972 | Owen | 29/95 |
| 3,701,187 | 10/1972 | Erkfritz | 29/95 |

*Primary Examiner*—Leonidas Vlachos

[57] ABSTRACT

A set of inserts for a cutter is disclosed herein. Each insert in the set is polygonal in shape and has three or more identical sides of equal length and two parallel faces generally perpendicular to the sides. The sides have symmetrical, equally spaced serrations having a cutting crest and cutting flanks formed in them. Each insert can be indexed in the cutter by rotating it in its seat to expose another of the sides for cutting. When the insert is made with the faces perpendicular to the sides, as in a negative insert, the inserts may be flipped over to present cutting edges on the opposite face. The center lines of the serrations on each insert are offset from the center line of the insert a distance equal to $(2n - K)/(2N)P$, where $P$ is the distance between the center line of adjacent serrations, $N$ is the number of inserts in the set, and $n$ is the position of the insert in the set, and $K$ is 1 when $N$ is even and 2 when $N$ is odd.

13 Claims, 10 Drawing Figures

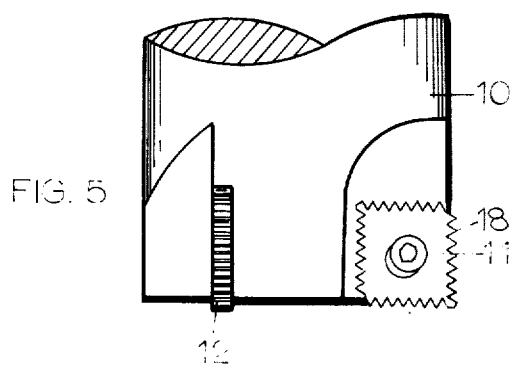
FIG. 5
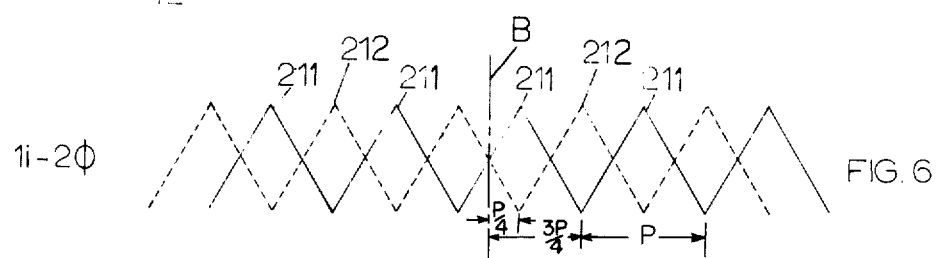
1i-2φ    FIG. 6
2i-3φ    FIG. 7
2i-4φ    FIG. 8
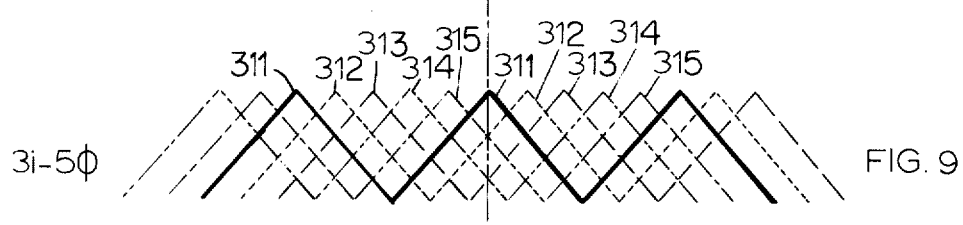
3i-5φ    FIG. 9
3i-6φ    FIG. 10

INSERTS FOR METAL CUTTERS

This is a continuation of application Ser. No. 280,776, filed Aug. 15, 1972 and now abandoned.

REFERENCE TO PRIOR ART

The Penoyar U.S. Pat. No. 3,574,911 shows a cutter having inserts that have at least three sides and each side has serrations that are out of phase with the serrations on the other sides. Thus, when any side of an insert becomes dulled or damaged, the insert must be removed from the cutter and flipped over or exchanged for an insert having a sharp side corresponding to the dull side of the insert that is removed. When two of the same number of sides on an insert become dulled or damaged, the insert must be removed from the cutter and moved to a different pocket in the cutter or stored. Due to human error, in indexing and assembling the inserts in the cutter, the probability is great that the sides may be confused and the insert may be out of proper phase with other inserts, thereby increasing the rate of breakage of inserts. Brinneling of the seats of the cutter resulting in damaged cutters is also a problem with the inserts of the '911 patent.

The U.S. Pat. No. 3,636,602 to Owen shows an insert for a cutter that has serrations defining lands. Such an insert has disadvantages because it cuts primarily on the flat lands. The flat lands result in an undesirable chatter in the machining that is familiar to those skilled in the art.

GENERAL DESCRIPTION OF INVENTION

Each of the sides of the inserts disclosed herein are identical to each other side. Therefore, each cutting edge of a particular insert can be used in sequence in any given pocket of a cutter without moving the insert to a different pocket and the insert does not have to be removed from a pocket until all of its edges on one face are dulled. It may then be flipped over and used until the insert is completely used up and, at that point, the insert can be discarded, thereby reducing the chance of human error in indexing and thereby saving time and reducing the rate of breakage of inserts. The inventory of partly used inserts at any time is reduced, as well as the time for selecting inserts having the proper unused side since all sides are identical in any insert in a set of applicant's inserts.

OBJECTS OF THE INVENTION

It is an object of the invention to provide an improved insert for a cutter.

Another object of the invention is to provide an improved set of inserts for a cutter that is simple in construction, economical to manufacture, and simple and efficient to adjust and interchange inserts.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 5 is a partial side view of a cutter suitable for supporting four inserts.

FIG. 6 is a schematic layout of an insert arrangement similar to FIGS. 3 and 4.

FIG. 7 is a schematic layout of a three phase arrangement using two inserts.

FIG. 8 is a schematic layout of a four phase arrangement using two inserts.

FIG. 9 is a five phase arrangement using three inserts.

FIG. 10 is a six phase arrangement using three inserts.

DETAILED DESCRIPTION OF THE DRAWINGS

The inserts disclosed herein, which make up the sets of inserts, are polygonal in shape and have identical serrated sides, and are of two general types. General types of sets are sets made up of even numbers of inserts and sets having odd numbers of inserts. Each set of inserts that contains an odd number of inserts has one insert wherein the center line of the insert passes through the center crest of that side. All other inserts in all sets have the center of all crests offset from the center line of the insert. Examples of sets of odd numbers of inserts are shown in FIGS. 7, and 9.

The cutter 10 in FIG. 5 is shown supporting inserts 11 and 12. The cutter 10 is of a type familiar to those skilled in the art, suitable for supporting cutting inserts.

Figure 3:
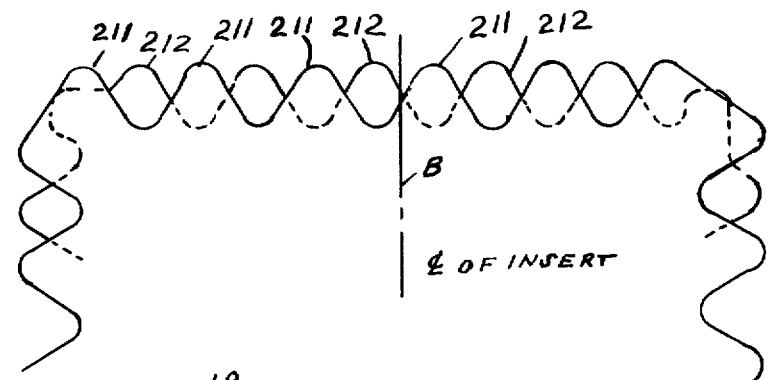
FIG. 3 is a view similar to FIG. 1 showing a cutter having two inserts.
Figure 4:
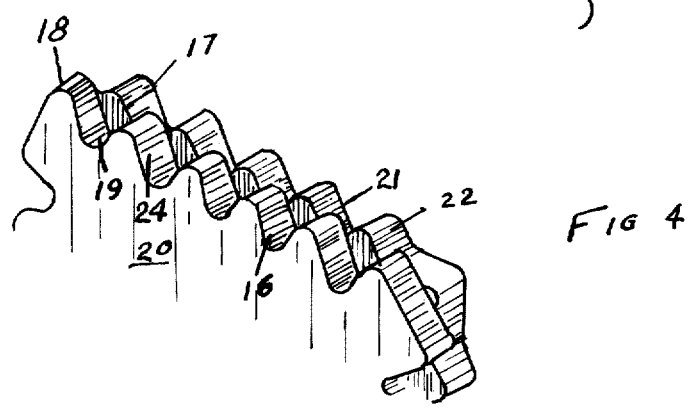
FIG. 4 is an isometric view showing two inserts used together according to the invention.

The inserts shown in FIGS. 3 and 4 are intended to be square, having two parallel faces 20 and 21 and peripheral edges 22 that intercept the faces and form cutting edges 17. The peripheral edges 22 define the serrations 16 that have crests 18 and recesses 19. The serrations are equally spaced on each side and are identical. The spacings of the center line of the crest adjacent the center line of the insert from the center line of the insert in a set is defined by equation $S = (2n - K)/(2N)P$, where $S$ is the spacing of the center line of the serration from the center line of the insert; $P$ is the distance between the center line of the serrations; $n$ is the numerical position of a given crest in a series of crests each being on an insert of a set of inserts, the initial crest of the series being on or adjacent to the center line of the insert; and $N$ is the number of inserts in the set; $K$ is a factor of 1 when $N$ is an even number and $K$ is a factor of 2 when $N$ is an odd number. Comparing this equation to sets of inserts of 2, 3, 4, 5, and 6, the following table of spacing applies:

| | |
|---|---|
| P = | distance between centers of serrations |
| N = | number of inserts in a set |
| n = | numerical position of a given crest in a series of crests, each being on an insert of a set of inserts, the initial crest of the series being on or adjacent to the center line of the insert |
| K = | a factor of 1 when N is an even integer and 2 when N is an odd integer |
| S = | spacing of the center of the serration on an insert from the center line of the insert |

$$S = 2n - K/2N \; P$$

| Index No. of Insert | N No. of Inserts in Set | n Position of Insert | K | K/N | S |
|---|---|---|---|---|---|
| FIG. 6 | | | | | |
| 211 | 2 | 1 | 1 | ½ | P/4 |
| 212 | 2 | 2 | 1 | ½ | 3P/4 |
| FIG. 7 | | | | | |
| 111 | 3 | 1 | 2 | ⅔ | 0 |
| 112 | 3 | 2 | 2 | ⅔ | P/3 |
| 113 | 3 | 3 | 2 | ⅔ | 2P/3 |
| FIG. 8 | | | | | |
| 11 | 4 | 1 | 1 | ¼ | 1P/8 |
| 12 | 4 | 2 | 1 | ¼ | 3P/8 |
| 13 | 4 | 3 | 1 | ¼ | 5P/8 |
| 14 | 4 | 4 | 1 | ¼ | 7P/8 |
| FIG. 9 | | | | | |
| 311 | 5 | 1 | 2 | 2/5 | 0 |
| 312 | 5 | 2 | 2 | 2/5 | P/5 |
| 313 | 5 | 3 | 2 | 2/5 | 2P/5 |
| 314 | 5 | 4 | 2 | 2/5 | 3P/5 |
| 315 | 5 | 5 | 2 | 2/5 | 4P/5 |
| FIG. 10 | | | | | |
| 411 | 6 | 1 | 1 | 1/6 | P/12 |
| 412 | 6 | 2 | 1 | 1/6 | 3P/12 |
| 413 | 6 | 3 | 1 | 1/6 | 5P/12 |
| 414 | 6 | 4 | 1 | 1/6 | 7P/12 |
| 415 | 6 | 5 | 1 | 1/6 | 9P/12 |
| 416 | 6 | 6 | 1 | 1/6 | 11P/12 |

Figure 1:
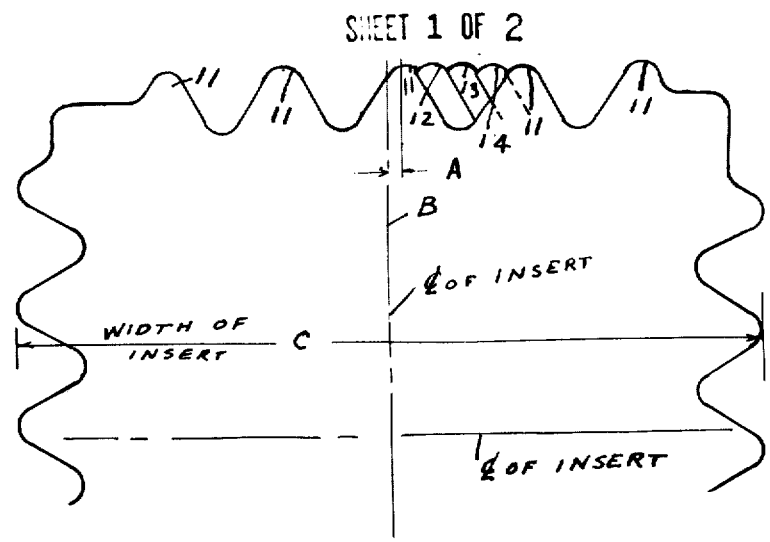
FIG. 1 is a schematic view of one embodiment of the cutter showing four inserts according to the invention.

FIGS. 1 and 8 illustrates a set of four inserts. Therefor, N is four and being an even number, K is 1 and n is 1 for the center of the serration of insert 11 nearest the center line B. The offset of the center of the first serration 11 from the center line B of the insert is an amount P/8. The distance of the second serration, insert 12, is (3P/8). The spacing of the serration adjacent the center line of the insert 13 is (5P/8) and the distance of the center of the serration of insert 14 is (7P/8). Insert 11 and insert 14 are identical to each other but insert 14 is flipped over relative to insert 11. Insert 12 is identical to insert 13 but is flipped over relative to insert 13.

Figure 2:
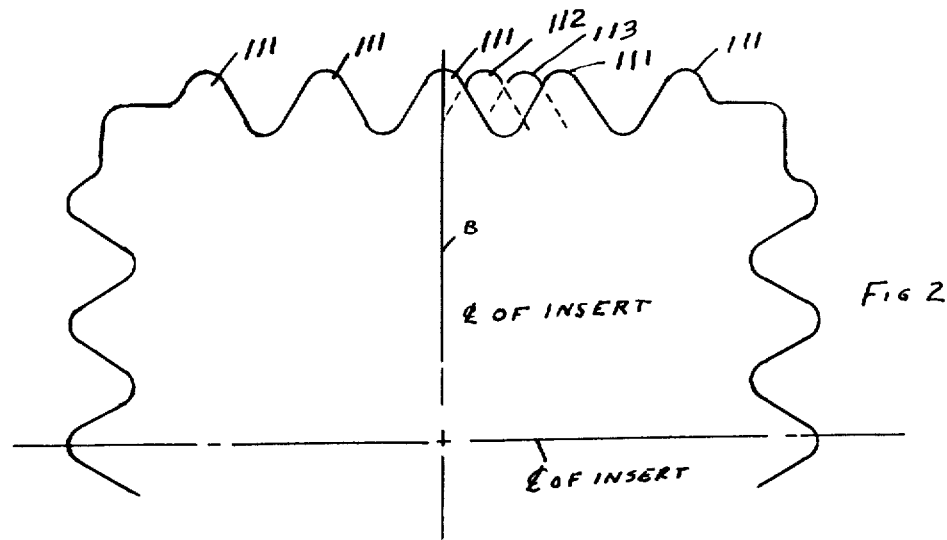
FIG. 2 is a schematic view of a cutter having three inserts.

FIGS. 2 and 7 illustrate an assembly of three inserts of two types which can be assembled to obtain three phases. The center line of the serration of insert 111 nearest the center line B of the insert is coextensive with the center line B of the insert and therefore it is offset from the center line of the insert by zero amount.

The center line of serration 112 nearest the center line B of the insert nearest the center line B of the insert is offset from the center line B by an amount of P/3. When considering the serration of insert 113 on a given side of the center line, the spacing of the serration nearest the center line is (2P/3). The inserts 112 and 113 are identical but one is flipped over relative to the other.

FIGS. 3, 4 and 6 show a set of two identical inserts making up a set of two. Insert 211 is flipped over relative to insert 212. The center line of the serrations 211 and 212 are offset from the center line of the insert by an amount as shown in the preceding table. Since insert 212 is flipped over relative to insert 211, it is considered to be insert No. 2 and its serration on one side is spaced from the center line of the insert by an amount calculated on the basis of $N = 2$.

FIG. 9 illustrates a set of five inserts of three types to obtain five phases. Insert 311 has the center line of its crest nearest the center line B of the insert coextensive with the center line of the insert and therefore the spacing of the crest nearest the center line B of the insert 311 from the center line B is zero.

Inserts 312 and 315 are identical and insert 313 and insert 314 are identical and the serrations of inserts nearest the center line B of the insert is spaced from the center line B of the insert by an amount shown in the preceding table.

FIG. 10 shows a set of six inserts. Insert 411 and insert 416 are identical, inserts 412 and 415 are identical, and inserts 413 and 414 are identical. The spacing of the crests of the inserts nearest the center line of the insert on a particular side are as shown in the preceding table.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A set of a plurality of inserts made up of a set of a number N of inserts to be mounted in a cutter and adapted to each cut an equal amount from a work piece, said inserts each having the shape of a regular polygon having a plurality of identical sides of equal length and two flat faces generally parallel to each other and perpendicular to said sides form a cutting edge at said face-side wall intersections, a plurality of equally spaced identical serrations formed in each said side of said insert and having their center lines spaced from each other a distance P, each said serration having a cutting crest and two angularly disposed cutting flanks, the distance S of the center line of any insert from the center line of the serration on that insert nearest one side of said center line of the insert is equal to $(2n - K/2N) P$, where N is the number of inserts in the set, n is the numeral position of a given crest in a series of crests each being on an insert of a set of inserts, the initial crest of the series being on or adjacent to the center line of the insert, K is equal to one, where N is even, and K is equal to two, where N is odd.

2. The inserts recited in claim 1 wherein at least two of said adjacent inserts have serrations that are asymmetrical with respect to the center line of said insert.

3. The inserts recited in claim 2 wherein another said insert on said set comprises serrations that are symmetrical with respect to the center line of said sides of said inserts.

4. The inserts recited in claim 3 wherein at least two inserts in said set are identical.

5. The inserts recited in claim 1 wherein said set of inserts comprises four inserts and two of said inserts each have crests spaced from the center line of each of its sides by an amount of P/8 and the other two of said inserts each have a crest spaced from the center line of each side by an amount of P/4.

6. The inserts recited in claim 1 wherein said set of inserts comprises five said inserts and one of said inserts has a serration on the center line of each of its sides, two of the other said inserts each having a serration spaced from the center line of each side by an amount of $P/5$ and the other two of said inserts having a serration nearer the center line of each of its sides spaced from said center line by an amount of $P/5$.

7. The set of inserts recited in claim 1 wherein said sets of inserts includes at least two inserts that are identical to each other.

8. The set of inserts recited in claim 7 wherein said set of inserts includes one insert that has its center crest on each side disposed on the center line of that side.

9. The set of inserts recited in claim 7 wherein one said insert that is identical to the other is flipped over relative to the other.

10. The set of inserts recited in claim 1 wherein said set of inserts includes at least six inserts and three of said inserts are each identical respectively to one of the other three.

11. The set of inserts recited in claim 1 wherein said set of inserts includes at least five inserts and two said inserts are each identical respectively to one of the two other said inserts.

12. The set of inserts recited in claim 1 wherein said set of inserts includes at least three inserts and two of said inserts are identical.

13. The set of inserts recited in claim 1 wherein said set of inserts includes at least eight inserts and four said inserts are each identical respectively to four other said inserts.

* * * * *